July 26, 1938.  C. R. NICHOLS  2,124,892
WELL SURVEYING INSTRUMENT
Filed Aug. 16, 1934   2 Sheets-Sheet 1

INVENTOR
Charles R. Nichols
BY
Busser & Harding
ATTORNEYS.

WITNESS:

July 26, 1938.  C. R. NICHOLS  2,124,892
WELL SURVEYING INSTRUMENT
Filed Aug. 16, 1934   2 Sheets-Sheet 2
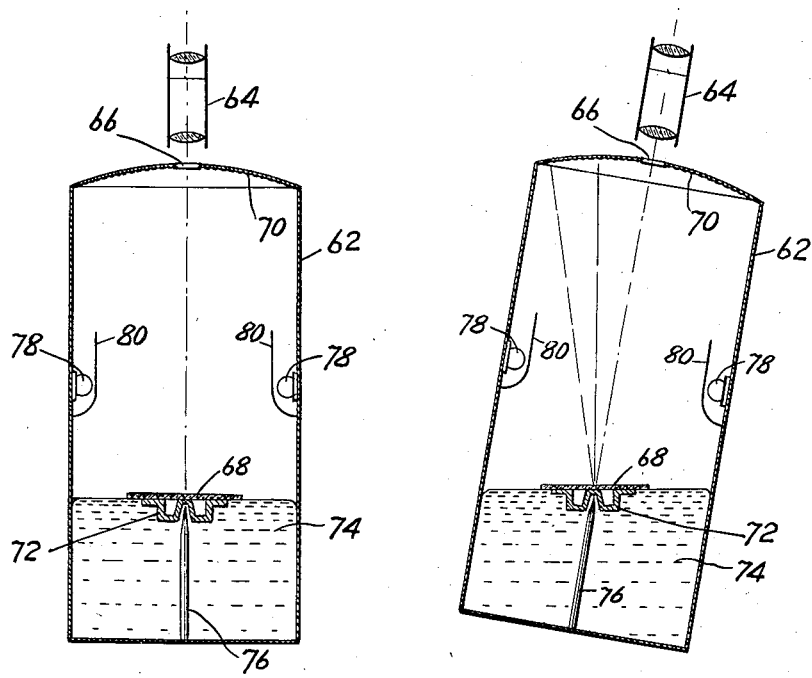
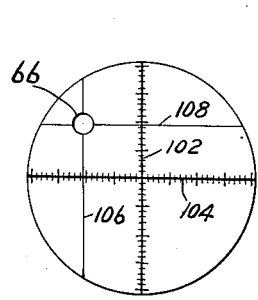
FIG.6.
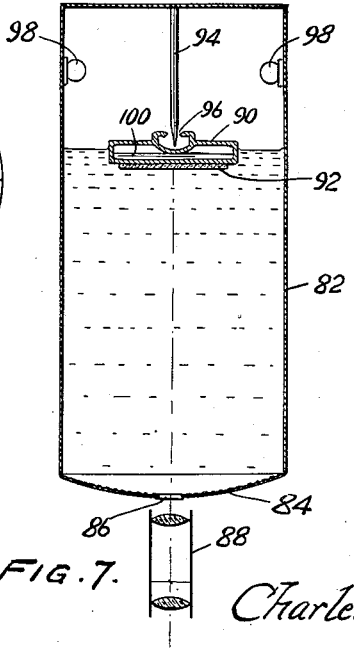
FIG.7.
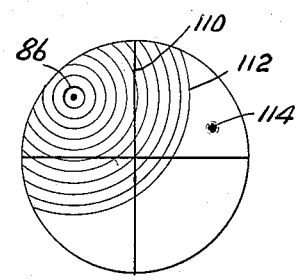
FIG.8.
INVENTOR
Charles R. Nichols
BY
Busser & Harding
ATTORNEYS.
WITNESS:

Patented July 26, 1938

2,124,892

UNITED STATES PATENT OFFICE 2,124,892

WELL SURVEYING INSTRUMENT

Charles R. Nichols, Dallas, Tex., assignor to Sperry-Sun Well Surveying Company, Philadelphia, Pa., a corporation of Delaware Application August 16, 1934, Serial No. 740,111

8 Claims. (Cl. 33—205.5)

This invention relates to a bore hole surveying instrument and has particular reference to improvements in inclination indicating means of such instruments.

While the present invention is more generally applicable, it is particularly designed for use in the type of well surveying instrument described in Patent No. 1,960,038 issued jointly to Samuel H. Williston and the present applicant on May 22, 1934. The instrument described in said patent is designed to produce a series of photographic records made at various depths in a bore hole, which records indicate simultaneously the amount of inclination, the direction of such inclination, and, preferably, the time at which the exposure was made. The amount of inclination in said device is indicated by the photographic image of a bubble of a box level. The bubble in such box level moves over a semi-spherical transparent surface, the curvature of which depends upon the range of the instrument and its sensitivity. The bubble so provided is satisfactory to a very substantial degree and indicates accurately deviations of the instrument amounting to small fractions of degrees. However, as the sensitivity of the instrument is increased by reducing its range and correspondingly increasing the radius of curvature of the box level cover across which the bubble moves, the buoyant forces tending to move the bubble are no longer sufficient to insure, with certainty, a smooth movement of the bubble to the uppermost position wherein it would indicate the inclination of the instrument.

The present invention is concerned with the design of an inclination indicating arrangement adapted for photographic recording which is substantially more sensitive to attainment of precise equilibrium when small angles of inclination are involved than the bubble heretofore used. In the following description, this apparatus is described primarily in conjunction with the gyroscopic instrument forming the subject matter of said patent. It is capable of much wider use, however, being applicable to such instruments as are designed to produce records showing inclination only, without reference to the direction of such inclination. Furthermore, as will be indicated hereafter, magnetic direction indicating means may be incorporated in the device, so that direction and inclination of a bore hole which is uncased and free from disturbing magnetic influences, may be ascertained. The device is, of course, applicable to single or multiple shot instruments.

Detailed objects of the invention will be apparent from the following description read in conjunction with the accompanying drawings:

Figs. 4 and 5 show, in vertical and tilted positions respectively, a modified embodiment of the invention;

Fig. 6 is a diagram similar to Figs. 2 and 3 showing another type of record obtained by variation of markings;

Fig. 7 shows, in diagrammatic vertical section, a further embodiment of the invention; and Fig. 8 is a diagram illustrating the type of record made by the use of the embodiment of Fig. 7.

Figure 1:
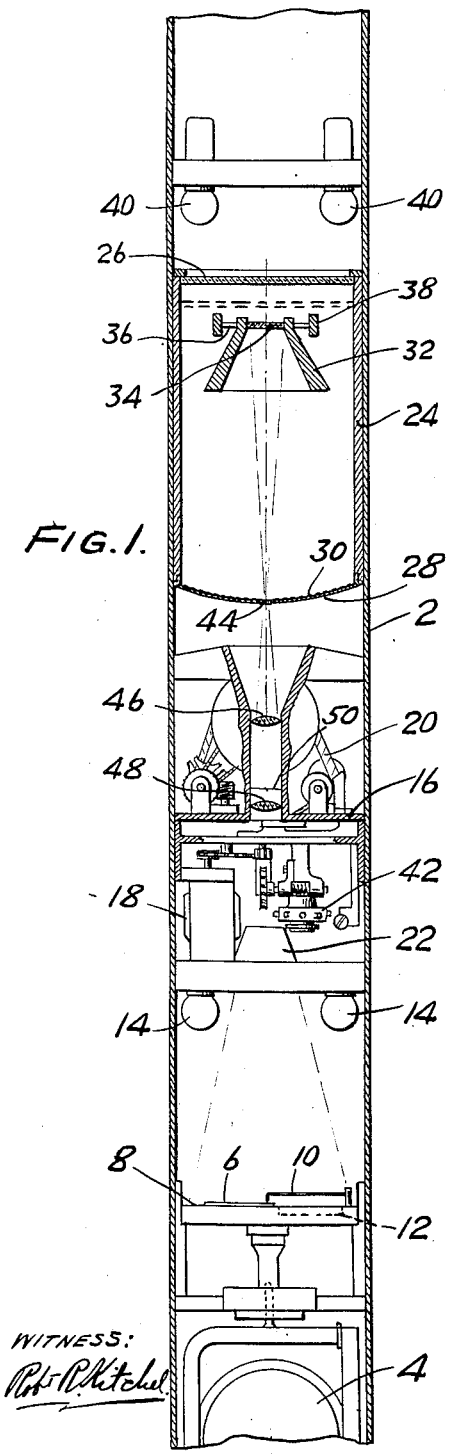
Fig. 1 is a fragmentary vertical section showing the associated parts of a well surveying instrument embodying the present invention.
Figure 2:
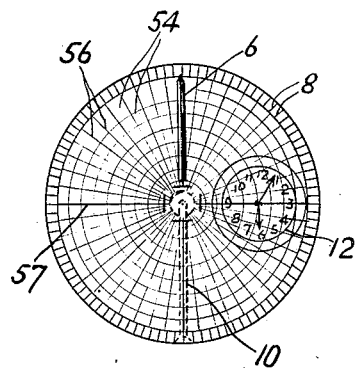
Fig. 2 is a diagram illustrating the type of record made when the instrument is in vertical position.
Figure 3:
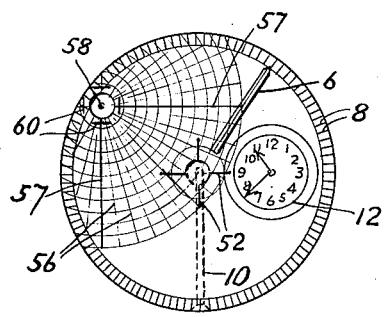
Fig. 3 is a similar diagram showing the type of record made when the instrument is inclined.

Referring first to the modification of the invention illustrated in Figs. 1, 2 and 3, there is shown at 2, the inner housing of a well surveying instrument designed to be received within an armored protective casing of the type indicated in the patent referred to above. The major portion of the mechanism constituting the instrument is similar to that shown in the patent comprising, among other things, an electrically driven gyroscope 4, the vertical gimbal ring of which carries a pointer indicated at 6 which moves adjacent a graduated scale 8. This scale may be marked in a manner definitely relating it to the surveying instrument housing or, alternatively, and as is the case at present, the relationship of the gyroscope to the surveying instrument may be indicated by the image of the lead wire 10 which passes radially across the path of the pointer 6 and serves to lead current into the gyroscope. The wire 10 is slightly out of focus and on the final record appears sufficiently indistinct not to interfere with accurate readings, but nevertheless sufficiently distinct to provide an origin from which references may be made. Located in the plane of the pointer 6 and scale 8 there is provided a watch 12 which indicates the time at which a record is made and, by synchronism with a watch at the surface, serves for the determination of the depth at which a record was made, corresponding times and depths being noted at the surface. The devices just described, which are arranged to be photographed, are intermittently illuminated by lamps 14, photographing taking place through a camera 16 which is supplied with motion picture film and is intermittently operated to secure successive exposures at properly timed intervals, the camera mechanism being driven by a motor indicated at 18. The motion picture film is indicated at 20 and passes in the plane of projection of a lens system indicated at 22.

Above the camera there is located, in place of the box level shown in the above mentioned patent, a device constituting an embodiment of the present invention. This comprises a casing 24 provided with a transparent or translucent cover plate 26 and having a preferably semispherical bottom 28 which, except at its central portion, is opaque and carries on its interior a scale 30. In the center of the bottom 28 there is a window 44 serving for the outward passage of rays to the camera optical system comprising lenses such as 46 and 48, which is located above the film and corresponds to the system 22 located therebelow. The arrangement is such that images may be projected from both sides of the film thereon to secure superimposed records of the instruments above and below the camera.

Within the casing 24, which is partially filled with a suitable transparent liquid, there is located a hollow conical or other suitable pendulum 32 which, at its upper end, supports a downwardly facing mirror 34. The pendulum is supported upon horizontal pivots indicated at 36 by a gimbal ring 38 which is, in turn, supported from the casing 24 by pivots extending at right angles to the pivots 36 and journalled in the walls of the casing. The axes of both sets of pivots lie in the plane of the reflecting surface of the mirror when the apparatus is vertical. Accordingly, the center point of the mirror corresponding to the point of intersection of these axes remains fixed in the apparatus.

Lamps 40, throwing their rays through the transparent cover 26, serve to illuminate the scale 30 an image of which is viewed by the camera through the window 44 by reflection. In order to make the window 44 as small as possible, the rays are preferably brought approximately to a focus at the location of this window. Desirably, however, the focus is not a sharp one, since the window preferably carries a marking in its center, as will be referred to hereafter. A timing arrangement indicated at 42 controls the current to lamps 14 and 40 so as to cause the same to flash, when the film is stationary, to produce exposures.

Reference to Figs. 2 and 3 will indicate the type of scale 30 which is used and the type of superimposed records provided from which a complete definition of the inclination and direction of the bore hole may be obtained. There is carried at 50 in the optical system a transparent plate having thereon cross-hairs the image of which as indicated at 52 is projected upon the film by lens 48. The intersection of these cross-hairs serves to mark the central point to which measurements are referred. The adjustment is such that the axis of the pointer 6 passes through this intersection.

The scale 30 in its most elaborate form is provided with a series of circles indicated at 54, so spaced as to indicate angular deviations of certain specified amounts. Instead of being formed upon a semispherical surface, as indicated in Fig. 1, a plane surface may be provided to form the bottom of the housing 24, and the arrangement of the circles, which will then be concentric, may be such as to still indicate directly the inclination.

To assist in reading the direction, there are also provided radially extending lines 56. These may be marked so that the value of that line which passes through the intersection of the cross-hairs 52 plus the angle of deviation of the gyroscope pointer measured algebraically from some point of reference, will indicate directly the angular deviation of the inclination from, say, the geographical north measured in a clockwise direction.

Because of the window 44, the markings cannot be conveniently continued into the center. However, there may be provided in the center of the window 44 a mark 58 indicating the precise center of the arrangement. This is desirable when very small angles of inclination occur, since then this point may be scaled from the intersection of the cross-hairs to give an accurate reading. For the same purpose, there may be provided marks such as 60 which, by superposition upon the cross-hairs and scaling, will indicate small angular deviations. Lubber-lines 57 in the form of heavy radial lines may be additionally provided for ready reading.

The liquid in which the pendulum is suspended serves to provide damping so that readings may be made without delay caused by oscillations of the pendulum. By the choice of a suitable viscous liquid compared with the constants of the pendulum, critical damping may be provided so that the pendulum is brought very readily to rest after being disturbed, while nevertheless it will attain a position in which its center of gravity is precisely vertically below the intersection of the axes of its pivots. It will be obvious that this arrangement is capable of indicating deviations to any degree of accuracy desired. Reading of small angular deviations is facilitated, furthermore, due to the fact that there occurs, in effect, a magnification because of the optical arrangement and the provision of a mirror such that, for a given angular deviation from the vertical, the corresponding incident and reflected rays passing through the optical center form an agle with each other equal to twice this angle of deviation.

The type of inclination sensitive device mentioned above is used where photography from below is desired, as, for example, when a pointer occurs on the upper end of a gyroscope so that the inclination sensitive device must be above the camera. In cases where photography from above is permissible, where, for example, a gyroscopic or magnetic arrangement is reversed in position so that its indicating means lies below it, or where no direction instrument is involved but records of inclination only are to be made, the invention may have an embodiment such as indicated in Figs. 4 and 5. In this case, a vessel 62 located below the optical system 64 is provided with a cover 70 in the center of which there is a transparent window 66. Floating on mercury in this vessel, which is desirably cylindrical, there is a member 72 carrying a mirror 68 with its reflecting surface facing upwardly. A pin 76 serves to prevent this float and mirror from moving too far from central position, although slight movements have no effect, since, if the container 62 is cylindrical in cross-section, the intersection of the axis of the container with the surface of the mercury and hence with the reflecting surface of the mirror, will remain constant in position. It may be noted that the reflecting surface of the mirror preferably lies in the plane of the surface of the liquid 74 to avoid the necessity of correcting the scale to eliminate errors due to the variations of distance from the optical system to the reflecting surface upon tilting. The scale may be readily corrected to take this into account, however, where it may be desirable to have the plane of reflection other than in the plane of the liquid surface.

Illumination of the scale carried on the interior of the cover 70 is effected by lamps 78, which are associated with shields 80 to avoid direct reflections upon the mirror 68 or direct passage of rays through the window 66. The operation of this modification will be obvious from that previously described, there being no difference in principle.

It is possible to vary considerably the scale arrangements, including those corresponding to the cross-hairs, to provide records of various kinds adapted for various purposes. Fig. 6 indicates the record produced by such alternative arrangement, in which cross-hairs 102 and 104, placed in the optical system of the camera, are graduated, while for the scale 30 there are substituted only two lubber-lines 106 and 108. By reading the crossings of these lines and the cross-hairs, the deviation may be readily calculated or read from a chart.

In Figs. 7 and 8 there is illustrated still another modification of the invention, in which there is incorporated in the movable mirror a magnet serving to maintain it oriented relative to the magnetic field. Such instrument, of course, is only useful where a hole is uncased or the instrument is subjected to no disturbing magnetic influences. The casing of the surveying instrument must be formed of non-magnetic material and electrical connections made to avoid disturbing fields. In this modification a vessel 82 is provided having a bottom 84 provided with a window 86 adjacent the optical system 88 of the camera. Upon a transparent liquid in this vessel, which should be cylindrical, there is a float 90 carrying on its under surface a mirror 92 with its reflecting surface facing downwardly. A pin 94 enters an opening provided in the upper surface of the float to maintain it approximately centrally of the vessel 82. Illumination of the scales in the device is effected through lamps 98. A permanent magnet 100 carried in the float serves to effect its orientation.

In this case, in its simplest form the optical system of the camera may be provided with cross-hairs 110. The bottom 84 may be provided with an interior scale consisting of concentric circles as indicated at 112, while the surface of the mirror may be provided with a non-reflecting spot as indicated at 114, arranged to indicate the azimuth. Such marking may be out of focus, but the direction may be readily determined therefrom with a moderate degree of accuracy. Other records may, of course, be superimposed on the type of record illustrated in Fig. 8 as well as on the other records. It may be noted that in this modification the reflecting surface of the mirror does not coincide with the liquid surface. The scale may be calculated to take this into account to give true readings regardless of inclination.

It will be obvious that variations may be made in the embodiments of the invention requiring no more than adjustment of the optical system or changes in details. For example, if the scales, instead of being carried on semispherical surfaces, are plane, then the optical system must be such that all parts of such surface, particularly the central part, are still substantially in focus to an extent making possible accurate reading. Instead of providing transparent windows in metallic end closures for the liquid containing vessels, the closures may be of glass made opaque in those portions which carry scales.

What I claim and desire to protect by Letters Patent is:

1. In a well surveying device comprising a casing adapted to enter a bore-hole, a mirror arranged to maintain a reflecting surface in constant relation to the vertical, indicia fixed relatively to the casing, other reference indicia fixed relatively to the casing, means for illuminating both indicia, and means for photographing the first mentioned indicia by reflection from the mirror and the second mentioned reference indicia directly to form superposed records of both, said last means including a lens system for projecting optical images of both indicia on a sensitized surface.

2. In a well surveying device comprising a casing adapted to enter a bore hole, a mirror arranged to maintain a reflecting surface in constant relation to the vertical, a surface provided with index means fixed relatively to the casing, means for illuminating the index means, and means for photographing the index means by reflection from the mirror, said last means including a lens system fixed relative to the casing for projecting an optical image of the index means on a sensitized surface fixed relative to the casing during photographic exposure, whereby the location of the image of the index means on the sensitized surface indicates the inclination of the casing.

3. In a well surveying device comprising a casing adapted to enter a bore hole, means supporting a mirror and arranged to maintain a reflecting surface in constant relation to the vertical, said mirror supporting means comprising a universally supported pendulum, a surface provided with indicia fixed relatively to the casing, means for illuminating the indicia, and means for photographing the indicia by reflection from the mirror, said last means including a lens system fixed relative to the casing for projecting an optical image of the indicia on a sensitized surface fixed relative to the casing during photographic exposure, whereby location of the image of the indicia on the sensitized surface indicates the inclination of the casing.

4. In a well surveying device comprising a casing adapted to enter a bore hole, a body of liquid, means supporting a mirror and arranged to maintain a reflecting surface in constant relation to the vertical, said mirror supporting means comprising a universally pivoted pendulum damped by immersion in said liquid, a surface provided with indicia fixed relative to the casing, means for illuminating the indicia, and means for photographing the indicia by reflection from the mirror, said last means including a lens system fixed relative to the casing for projecting an optical image of the indicia on a sensitized surface fixed relative to the casing during photographic exposure, whereby the location of the image of the indicia on the sensitized surface indicates the inclination of the casing.

5. In a well surveying device comprising a casing adapted to enter a bore hole, a mirror arranged to maintain a reflecting surface in constant relation to the vertical, means for orienting the mirror in azimuth, a surface provided with indicia fixed relatively to the casing, means for illuminating the indicia, and means for photographing the indicia by reflection from the mirror, said last means including a lens system fixed relative to the casing for projecting an optical image of the indicia on a sensitized surface fixed relative to the casing during photographic exposure, whereby the location of the image of the indicia on the sensitized surface indicates the inclination and orientation of the casing.

6. In a well surveying device comprising a casing adapted to enter a bore-hole, a body of liquid, means supporting a mirror and arranged to maintain a reflecting surface in constant relation to the vertical, said mirror supporting means floating on the surface of said liquid, index means fixed relatively to the casing, means for illuminating the index means, and means for photographing the index means by reflection from the mirror, said last means including a lens system for projecting an optical image of the index means on a sensitized surface.

7. In a well surveying device comprising a casing adapted to enter a bore-hole, means supporting a mirror and arranged to maintain a reflecting surface in constant relation to the vertical, said supporting means being at least partially submerged in a liquid, index means fixed relatively to the casing, means for illuminating the index means, and means for photographing the index means by reflection from the mirror, said last means including a lens system fixed relatively to the casing for projecting an optical image of the index means on a sensitized surface fixed relatively to the casing during photographic exposure, whereby location of the image of the index means on the sensitized surface indicates the inclination of the casing.

8. In a well surveying device comprising a casing adapted to enter a bore hole, a body of liquid, a reflecting surface maintained by the liquid in constant relation to the vertical, index means fixed relatively to the casing, means for illuminating the index means, and means for photographing the index means by reflection from said reflecting surface, said last means including a lens system for projecting an optical image of the index means on a sensitized surface.

CHARLES R. NICHOLS.